(12) United States Patent
Andryukov

(10) Patent No.: US 11,661,208 B2
(45) Date of Patent: May 30, 2023

(54) SYSTEM FOR DETACHABLY COUPLING AN UNMANNED AERIAL VEHICLE WITHIN A LAUNCH TUBE

(71) Applicant: AEROVIRONMENT, INC., Simi Valley, CA (US)

(72) Inventor: Alexander Andryukov, Simi Valley, CA (US)

(73) Assignee: AEROVIRONMENT, INC., Arlington, VA (US)

( * ) Notice: Subject to any disclaimer, the term of this patent is extended or adjusted under 35 U.S.C. 154(b) by 1015 days.

(21) Appl. No.: 16/422,685

(22) Filed: May 24, 2019

(65) Prior Publication Data

US 2019/0308748 A1 Oct. 10, 2019

Related U.S. Application Data

(63) Continuation of application No. 14/561,894, filed on Dec. 5, 2014, now Pat. No. 10,442,554, which is a (Continued)

(51) Int. Cl.
*B64F 1/04* (2006.01)
*B64C 39/02* (2023.01)
(Continued)

(52) U.S. Cl.
CPC .............. *B64F 1/04* (2013.01); *B64C 39/024* (2013.01); *B64U 10/25* (2023.01); *B64U 30/12* (2023.01);
(Continued)

(58) Field of Classification Search
CPC ... B64F 1/04; B64C 39/024; B64C 2201/021; B64C 2201/08; B64C 2201/084;
(Continued)

(56) References Cited

U.S. PATENT DOCUMENTS 2,792,962 A * 5/1957 Granfelt .................. F41F 3/065
  89/1.816
3,279,319 A * 10/1966 Semonian ................. F41F 3/07
  89/1.701
(Continued)

FOREIGN PATENT DOCUMENTS

JP S62210398 A 9/1987
JP 2004333116 11/2004
(Continued)

OTHER PUBLICATIONS

European Search Report for European Serial No. 16193800 dated Mar. 6, 2017.
(Continued)

*Primary Examiner* — Medhat Badawi
(74) *Attorney, Agent, or Firm* — Concept IP LLP; Pejman Yedidsion; Eric Aagaard

(57) ABSTRACT

An unmanned aerial vehicle launch tube that has a tube, a sabot disposed in an interior of said tube, said sabot having a first clasp tab, and a clasp detachably coupled to said first clasp tab and contacting an inner circumferential wall of said tube so that said clasp is rotationally constrained by the inner circumferential wall and said first clasp tab.

13 Claims, 6 Drawing Sheets

Related U.S. Application Data continuation of application No. PCT/US2013/044697, filed on Jun. 7, 2013.

(60) Provisional application No. 61/656,949, filed on Jun. 7, 2012.

(51) Int. Cl.

| | | |
|---|---|---|
| B64U 10/25 | (2023.01) | |
| B64U 30/12 | (2023.01) | |
| B64U 50/13 | (2023.01) | |
| B64U 70/00 | (2023.01) | |
| B64U 70/70 | (2023.01) | |
| B64U 80/70 | (2023.01) | |

(52) U.S. Cl.
CPC ............. *B64U 50/13* (2023.01); *B64U 70/00* (2023.01); *B64U 70/70* (2023.01); *B64U 80/70* (2023.01)

(58) Field of Classification Search
CPC ........ B64C 2201/102; B64C 2201/165; B64C 2201/201; B64C 39/02; B64U 10/25; B64U 30/12; B64U 50/13; B64U 70/00; B64U 70/70; B64U 80/70
See application file for complete search history.

(56) References Cited

U.S. PATENT DOCUMENTS

| | | | |
|---|---|---|---|
| 4,063,486 A * | 12/1977 | Ashley | F41A 1/04 102/440 |
| 4,326,464 A * | 4/1982 | Price | F42B 14/061 102/518 |
| 4,399,999 A * | 8/1983 | Wold | F41F 3/052 277/560 |
| 4,410,151 A * | 10/1983 | Hoppner | F42B 10/14 89/1.819 |
| 4,616,554 A * | 10/1986 | Spink | F41F 3/04 89/1.816 |
| 4,726,298 A * | 2/1988 | Sigg | F42B 14/064 102/527 |
| 4,841,867 A * | 6/1989 | Garrett | F42B 14/064 102/523 |
| 4,944,210 A * | 7/1990 | Flock | F42B 29/00 89/1.816 |
| 5,164,539 A * | 11/1992 | French | F42B 14/064 102/520 |
| 5,193,517 A * | 3/1993 | Taylor | F41B 11/64 124/67 |
| 5,765,783 A * | 6/1998 | Albion | B64C 29/02 244/17.23 |
| 6,467,726 B1 * | 10/2002 | Hosoda | B64C 35/00 74/423 |
| 7,398,721 B1 * | 7/2008 | Alberding | F41F 3/04 89/1.819 |
| 7,934,456 B1 * | 5/2011 | Heitmann | F42B 14/064 102/522 |
| 8,089,034 B2 * | 1/2012 | Hammerquist | F42B 10/14 244/3.28 |
| 8,109,212 B2 * | 2/2012 | O'Dwyer | F42B 30/02 102/438 |
| 8,376,264 B1 * | 2/2013 | Hong | B64C 27/605 244/17.23 |
| 8,424,233 B2 * | 4/2013 | Cronin | F42B 14/00 102/431 |
| 8,439,301 B1 * | 5/2013 | Lussier | B64C 39/024 89/1.813 |
| 8,444,082 B1 * | 5/2013 | Foch | B64C 39/024 244/49 |
| 8,505,430 B2 * | 8/2013 | Miralles | F42B 39/14 89/1.816 |
| 8,887,641 B1 * | 11/2014 | Manole | F42B 14/06 102/521 |
| 9,187,184 B2 * | 11/2015 | Miralles | F41F 3/042 |
| 10,124,909 B2 * | 11/2018 | Miralles | F41F 1/00 |
| 10,450,089 B2 * | 10/2019 | Miralles | F42B 39/14 |
| 10,703,506 B2 * | 7/2020 | Miralles | B64F 1/04 |
| 2002/0077027 A1 * | 6/2002 | Wu | A63H 37/00 446/475 |
| 2003/0167957 A1 * | 9/2003 | Heitmann | F42B 14/02 102/521 |
| 2005/0188891 A1 * | 9/2005 | Heitmann | F42B 14/067 102/523 |
| 2005/0274845 A1 * | 12/2005 | Miller | B64F 1/06 244/49 |
| 2006/0192046 A1 * | 8/2006 | Heath | B64C 15/14 244/12.3 |
| 2008/0093501 A1 * | 4/2008 | Miller | B64F 1/06 244/49 |
| 2009/0007765 A1 * | 1/2009 | Hunn | F41F 3/04 89/1.818 |
| 2009/0134273 A1 * | 5/2009 | Page | B64C 39/024 244/63 |
| 2009/0193996 A1 * | 8/2009 | Brydges-Price | F42B 12/54 102/502 |
| 2010/0252676 A1 * | 10/2010 | Koessler | F41F 3/0413 89/14.05 |
| 2010/0281745 A1 * | 11/2010 | Condon | F41C 27/06 42/90 |
| 2011/0146525 A1 * | 6/2011 | Caillat | F42B 14/064 102/521 |
| 2011/0226174 A1 * | 9/2011 | Parks | B60F 5/02 114/313 |
| 2011/0315817 A1 * | 12/2011 | Miralles | B64F 1/06 244/63 |
| 2012/0000390 A1 * | 1/2012 | Heitmann | F42B 33/001 86/52 |
| 2012/0068002 A1 * | 3/2012 | Unger | F42B 10/64 244/3.28 |
| 2012/0205488 A1 * | 8/2012 | Powell | B63G 8/30 244/63 |
| 2015/0053193 A1 * | 2/2015 | Pruett | F41B 11/73 124/61 |
| 2016/0039536 A1 * | 2/2016 | Miralles | F42B 39/14 244/63 |
| 2016/0347476 A1 * | 12/2016 | Andryukov | B64C 39/024 |
| 2019/0023415 A1 * | 1/2019 | Miralles | F41F 3/042 |
| 2019/0308748 A1 * | 10/2019 | Andryukov | B64C 39/024 |
| 2020/0140120 A1 * | 5/2020 | Miralles | B64F 1/04 |
| 2020/0407061 A1 * | 12/2020 | Hafenrichter | B64C 39/024 |

FOREIGN PATENT DOCUMENTS

| | | | | |
|---|---|---|---|---|
| WO | 2011066030 A2 | 6/2011 | | |
| WO | WO-2011066030 | * | 6/2011 | ............. B64C 13/20 |

OTHER PUBLICATIONS

European Search Report for serial No. EP 13832668 dated Jan. 18, 2016.

International Search Report and Written Opinion for serial No. PCT/US2013/044697 dated Mar. 6, 2014.

* cited by examiner

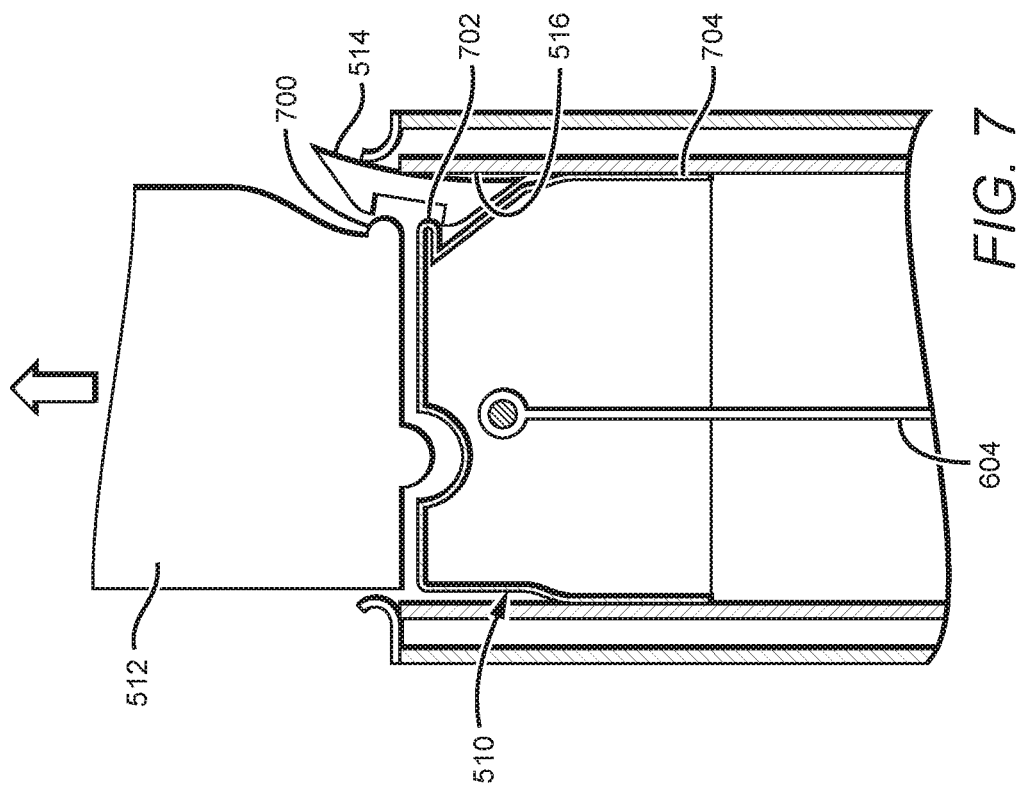
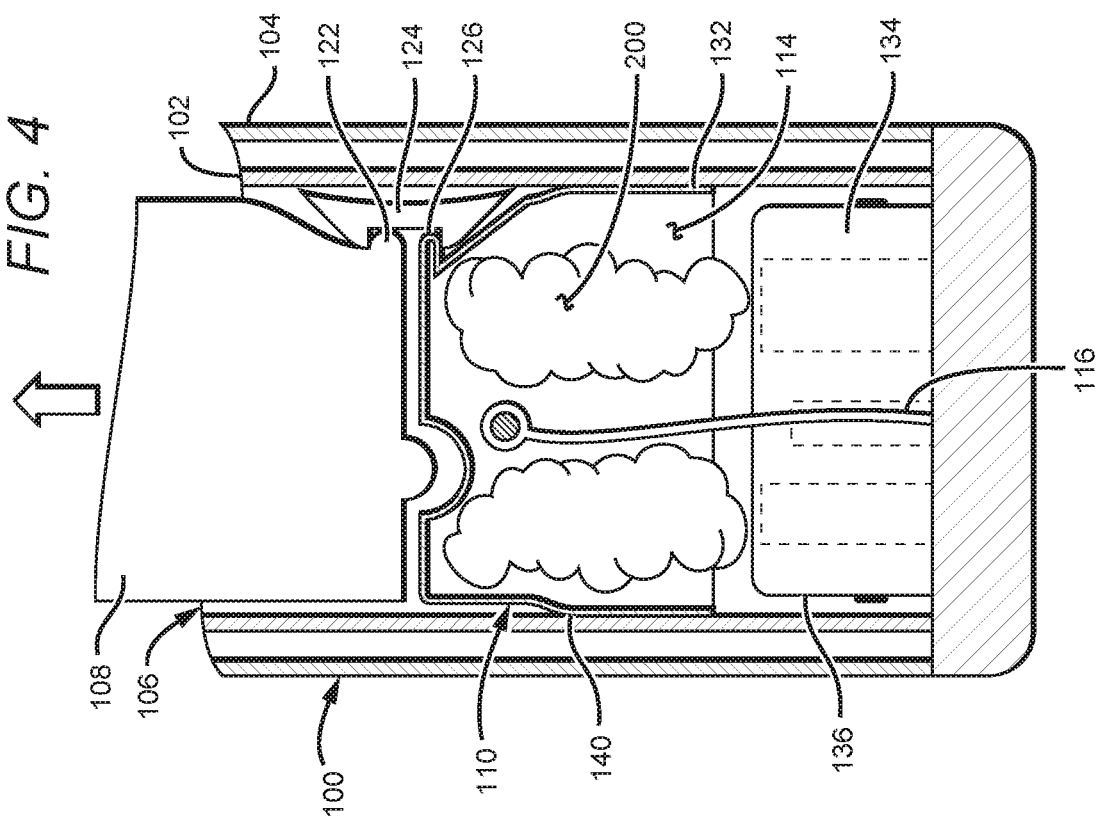

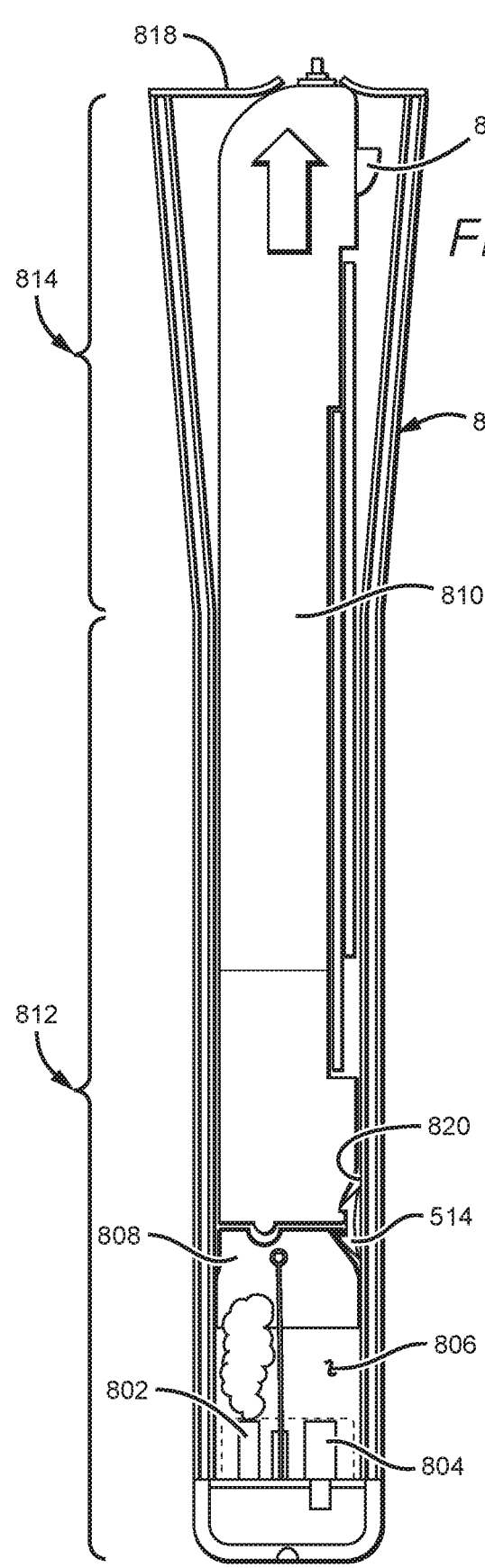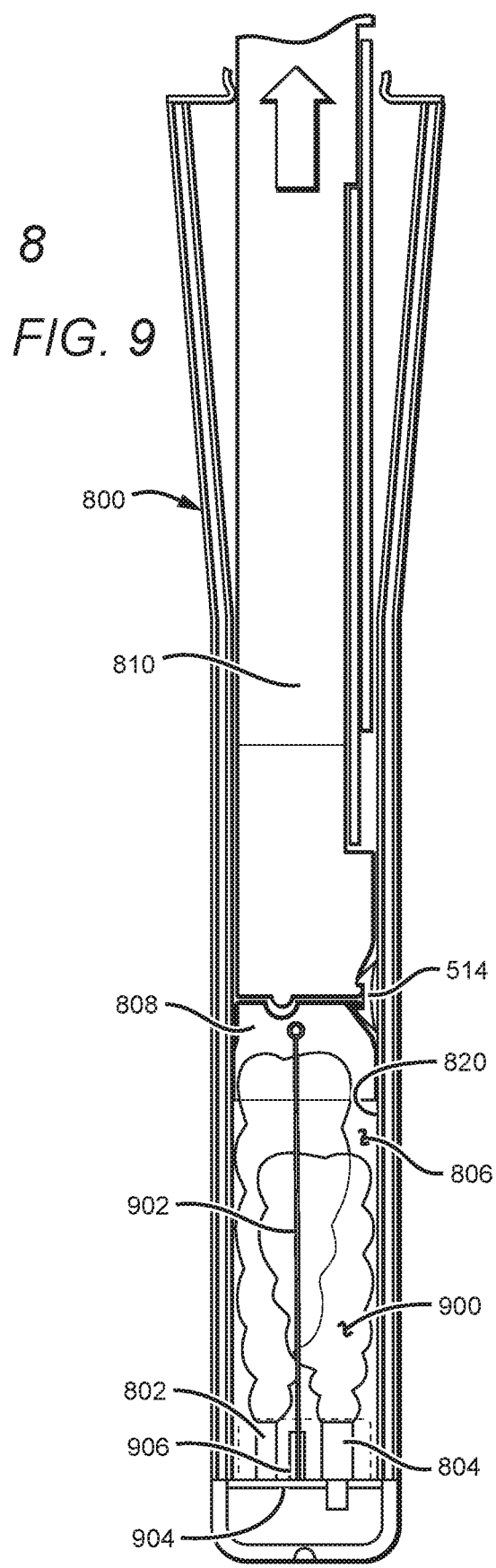

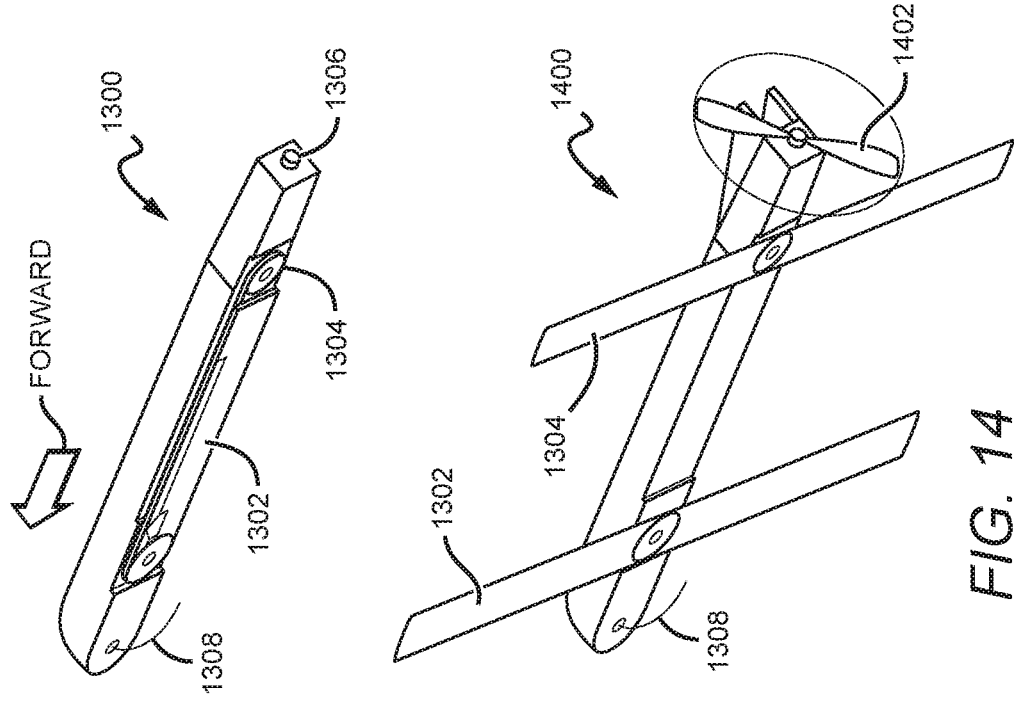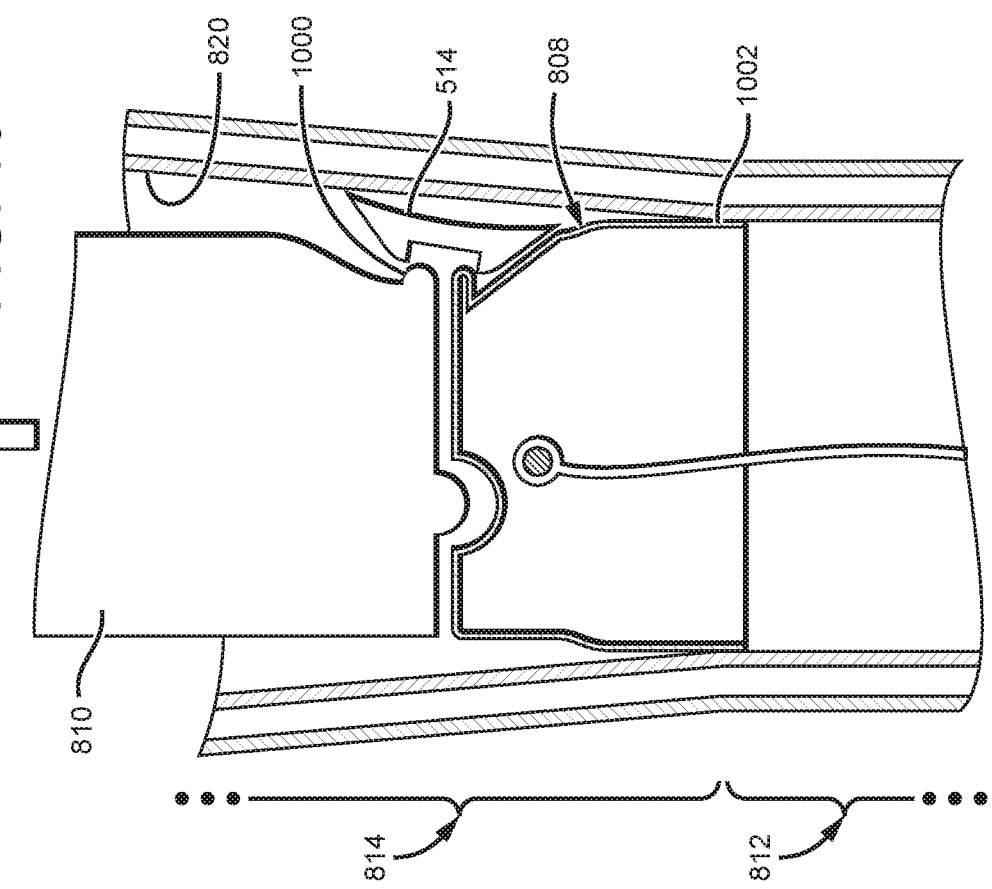

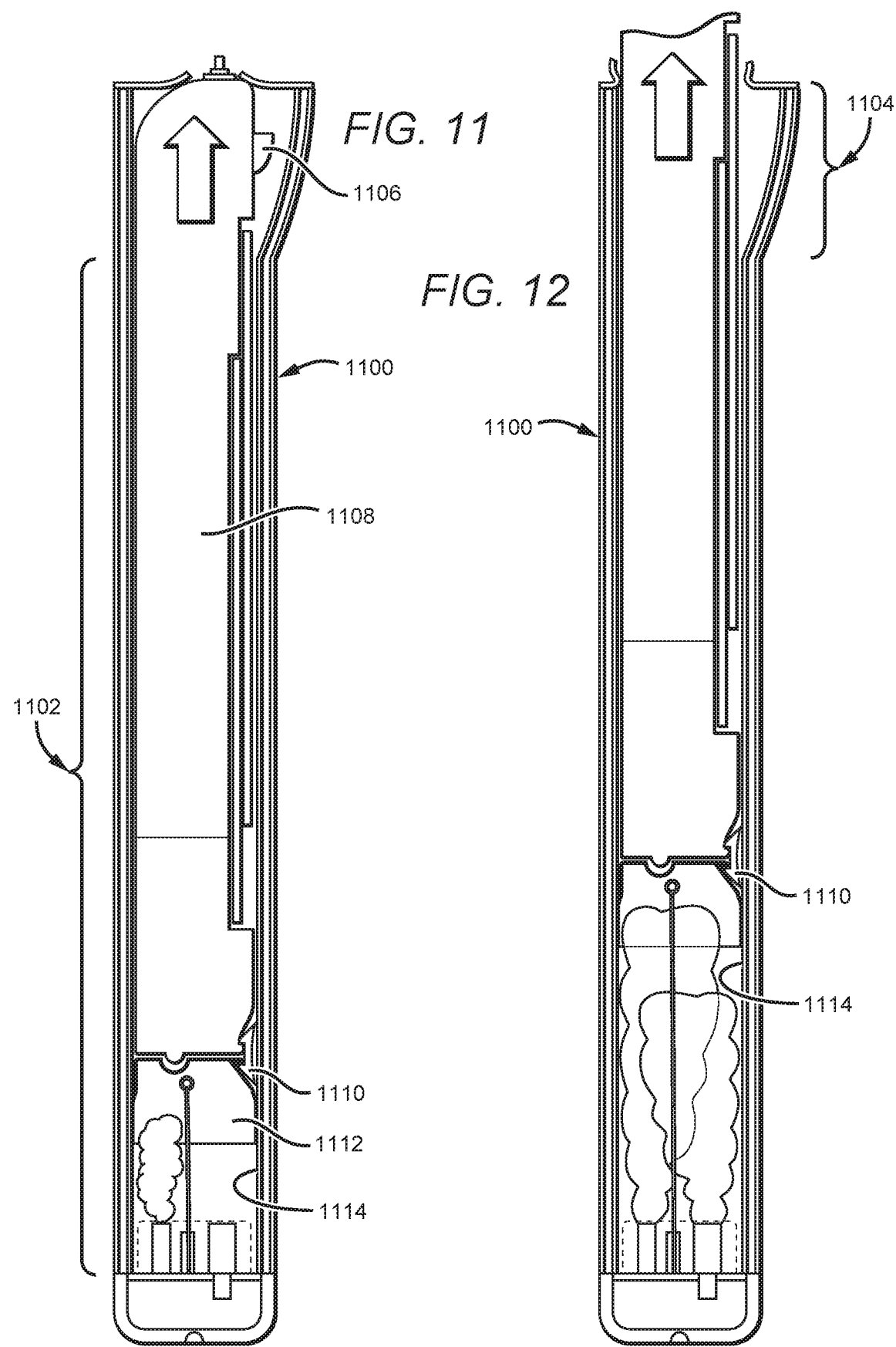

SYSTEM FOR DETACHABLY COUPLING AN UNMANNED AERIAL VEHICLE WITHIN A LAUNCH TUBE

CROSS-REFERENCE TO RELATED APPLICATIONS

This application is a continuation of U.S. Nonprovisional patent application Ser. No. 14/561,894, filed Dec. 5, 2014, which is a continuation of International Patent Application No. PCT/US2013/044697, filed Jun. 7, 2013, which claims priority to and benefit of Provisional Patent Application No. 61/656,949 filed Jun. 7, 2012, all of which are hereby incorporated herein by reference in their entirety for all purposes.

TECHNICAL FIELD

This invention relates to launch tubes that have a sabot; and more particularly to launch tubes and canisters, report-suppressing launch tubes, and sabots, for an unmanned aerial vehicle (UAV).

BACKGROUND

Typically UAVs are shipped to a launch site in an unassembled state. At the site they are assembled, tested, and launched. Launching is typically executed by hand, by an elastic tether, a powered wench, from a moving vehicle, or some combination thereof. Such methods can be time consuming and/or cumbersome. Once launched, a UAV may receive uplinks and may be guided by a human-in-the-loop, a human intermittently up-linking course corrections, e.g., via supervisory control, or by a preloaded intercept/strike point in combination with an onboard flight path guidance generator and outputs of inertial sensors and/or from a Global Positioning System (GPS) receiver.

SUMMARY

An unmanned aerial vehicle (UAV) launch tube apparatus is disclosed that may include at least one layer of prepeg substrate disposed about an aperture to form a tube, a sabot disposed in an interior of the tube, the sabot having a first clasp tab, and a clasp detachably coupled to the first clasp tab and contacting an inner circumferential wall of the tube so that the clasp is rotationally constrained by the inner circumferential wall and the first clasp tab. The sabot may also comprise an expandable skirt to provide a pressure seal with the inner circumferential wall of the tube. The expandable skirt may be axially restrained within the tube using an adhesive, and the adhesive may detachably bind the expandable skirt about a shell within the tube. In such an embodiment, the shell may consist of an exterior surface of a gas generator, the gas generator configured to generate gas to generate a high-pressure volume between the expandable skirt and the shell, and wherein the generated pressure is sufficient to push the expandable skirt off of the shell by breaking the adhesive restraint between the exterior surface of the gas generator and the expandable skirt. The apparatus may also have a UAV seated on the sabot, the UAV having a second clasp tab detachably coupled to the clasp and wherein the clasp is rotationally constrained by the inner circumferential wall, the first clasp tab, and the second clasp tab. The sabot may be tethered to the tube. The sabot may include a base sabot configured to engage the UAV, the base sabot having a first plurality of expandable partial skirt seals, and a circumferential sabot skirt seated on the base sabot, the circumferential sabot skirt having a second plurality of expandable partial skirt seals, so that the first and second pluralities of expandable partial skirt seals complete the pressure seal with the inner circumferential wall. The expandable skirt may be axially restrained within the tube using an adhesive, and the adhesive may detachably bind the expandable skirt about a shell within the tube so that generation of gas by the gas generator pushes the expandable skirt off of the gas generator by breaking the detachable binding of the adhesive. A UAV may be seated on the sabot, the UAV having a second clasp tab detachably coupled to the clasp, wherein the inner circumferential wall prevents the clasp from slipping off of the second clasp tab while the UAV is in the tube.

A method of launching an unmanned aerial vehicle (UAV) is disclosed that includes generating gas in a gas generator, introducing the gas to a high-pressure volume between an expandable sabot skirt of a sabot and the gas generator to break an adhesive coupling that restrains the sabot in a launch tube, pushing the expandable sabot skirt against an inner circumferential wall of the launch tube using the gas, and driving the sabot up a launch tube using the gas. The method may also be defined wherein the adhesive coupling includes an adhesive coupling between the expandable skirt and a shell surrounding the gas generator. The method may also include clasping a UAV to the sabot using a clasp, and restraining the clasp against the inner circumferential wall of the launch tube to prevent the clasp from decoupling from at least one of the UAV and the sabot. In some embodiments, the method may also include sliding the clasp past the inner circumferential wall to release at least one of the UAV and sabot from the clasp, and may include tethering the sabot to the launch tube to prevent the sabot from exiting the launch tube.

In another embodiment, a method of launching an unmanned aerial vehicle (UAV) includes restraining a sabot in a launch tube, introducing gas to a high-pressure side of an expandable sabot skirt of a sabot to break the restraint of the sabot in the launch tube, pushing the expandable sabot skirt against an inner circumferential wall of the launch tube using the gas, and driving the sabot up a launch tube using the gas. In such embodiments, the a sabot may be restrained using an adhesive, and the adhesive may be used to restrain an expandable skirt of the sabot to a shell surrounding a gas generator in the launch tube. The method may also include tethering said sabot to said launch tube. The expandable sabot skirt may also include a circumferential skirt protrusion that extends from said expandable sabot skirt toward an inner circumferential wall of said launch tube. The method may also include restraining the travel of said sabot by a tether configured to prevent said sabot from exiting said launch tube, and where the restrained travel of said sabot substantially retains said gas within said launch tube. In some embodiments, the tether may be attached to said sabot and said inner circumferential wall of said launch tube by a tether reel and/or a winding element.

Another embodiment may include an unmanned aerial vehicle (UAV) launch tube apparatus, comprising: a first aperture portion, where said first aperture portion comprises a constant cross-sectional area; a second aperture portion, where said second aperture portion comprises an enlarged cross-sectional area relative to said first aperture portion, and where said first aperture portion and said second aperture portion form a launch tube; a sabot disposed in said first aperture portion and configured to detachably couple to a UAV; where said sabot is configured to decouple from said UAV upon movement of said sabot from said first aperture portion to said second aperture portion. The sabot may be configured to detachably couple to said UAV by a clasp, said clasp configured to detachably couple to a first clasp tab of said sabot and a second clasp tab of said UAV. Said clasp may be rotationally constrained by at least one of: an inner surface of said first aperture portion, said first clasp tab of said sabot, and said second clasp tab of said UAV. Said clasp may be configured to decouple from said second clasp tab of said UAV upon movement of said sabot from said first aperture portion to said second aperture portion. Said clasp may be configured to decouple from said first clasp tab of said sabot upon movement of said clasp past an inner surface of said second aperture portion. Some embodiments may also comprise at least one gas generator, where said at least one gas generator is disposed in a bottom portion of said first aperture portion; and an expandable sabot skirt of said sabot, where a hollow end of said expandable sabot skirt is oriented toward said at least one gas generator, and where said expandable sabot skirt is axially restrained by a detachable restraint. Said at least one gas generator may be configured to generate gas, and said expandable sabot skirt may be configured to substantially retain said gas within said launch tube. Said generated gas may be configured to detach said expandable sabot skirt from said detachable restraint and propel said sabot from said first aperture portion to said second aperture portion. Said expandable sabot skirt may be configured to expand to said enlarged cross-sectional area of said second aperture portion and continue to substantially retain said gas in said second aperture portion of said launch tube. Some embodiments may further comprise a tether attached to said sabot and a bottom portion of said first aperture portion, where said tether may be configured to restrain a movement of said sabot such that said expandable sabot skirt substantially retains said gas from escaping past an opening in said launch tube.

BRIEF DESCRIPTION OF DRAWINGS

Embodiments are illustrated by way of example and not limitation in the figures of the accompanying drawing, and in which:

FIG. 4 depicts gas driving the sabot up the launch tube illustrate in FIG. 1, and the sabot detachably coupled to the UAV using a clasp that is restrained by an inner sidewall of the launch tube;

FIG. 7 depicts the clasp illustrated in FIGS. 5 and 6 falling away from the UAV as the inner sidewall restraint is removed;

FIGS. 8 and 9 depict an exemplary UAV launch with the sabot detachably coupled to the UAV using, in one embodiment, a clasp restrained by the inner sidewall of the launch tube within one portion of the launch tube;

FIG. 10 depicts the clasp illustrated in FIGS. 8 and 9 falling away from the UAV as the inner sidewall restraint is removed in another portion of the launch tube;

FIGS. 11 and 12 depict a UAV launch tube with another embodiment of an enlarged-aperture launch end, with a UAV and sabot coupling clasp restrained by the inner sidewall of the launch tube within one portion of the launch tube; and FIGS. 13 and 14 depict an exemplary UAV with its airfoils deployed and its pusher propeller rotating.

DETAILED DESCRIPTION

An unmanned aerial vehicle (UAV) launch tube apparatus is disclosed that has prepeg substrate disposed about an aperture to form a tube, a sabot is disposed in the interior of the tube with the sabot having a first clasp tab, and a clasp is detachably coupled to the first clasp tab and contacts an inner circumferential wall of the tube so that the inner circumferential wall restrains the clasp from slipping off of the first clasp tab while the UAV is in the tube. In this manner, the UAV may be assembled, tested and restrained in the launch tube prior to further transportation to a launch site.

Figure 1:
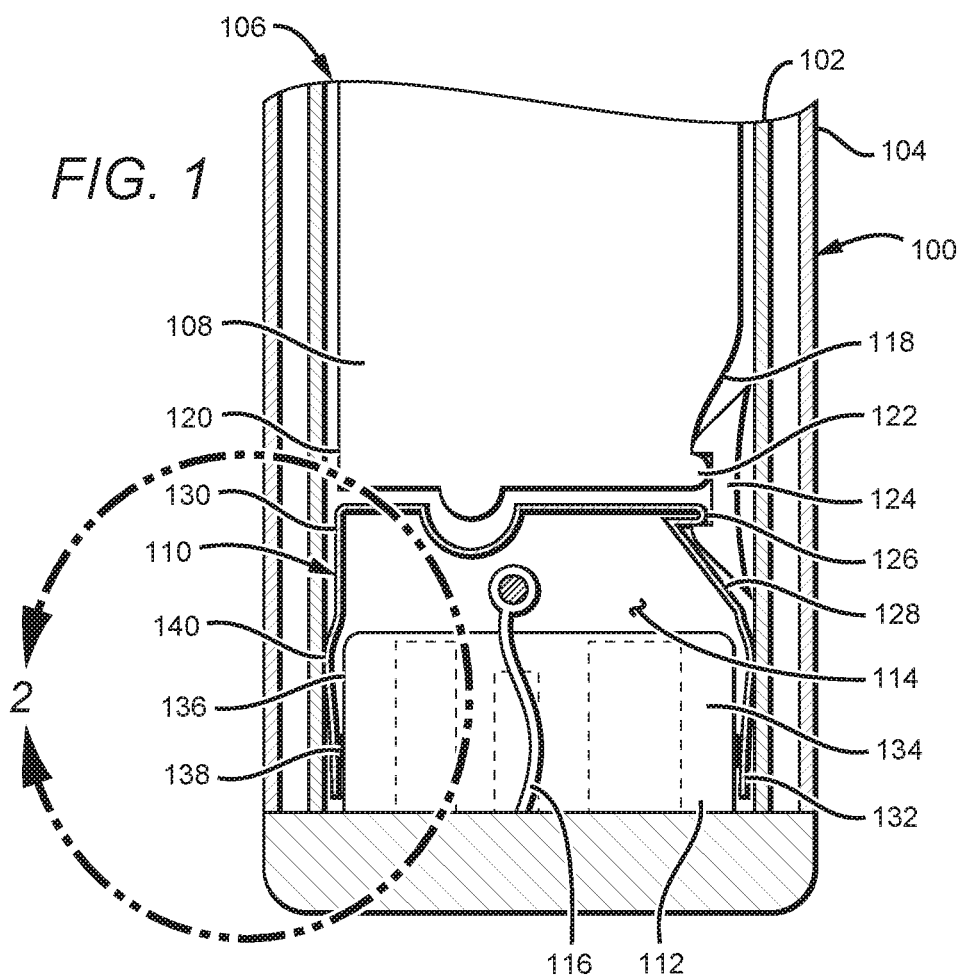
FIG. 1 depicts one embodiment of an expandable skirt coupled to a shell within a launch tube using an adhesive, and the sabot detachably coupled to a UAV.

FIG. 1 illustrates one embodiment of a UAV 108 that is detachably restrained in a launch tube 100 for testing and/or further transportation to a launch site. The launch tube 100 may have inner and outer circumferential walls (102, 104) disposed about an aperture 106. In some embodiments, the launch tube 100 may be formed of a single walled structure. The UAV 108 is illustrated disposed in the aperture 106 adjacent the inner circumferential wall 102, with the UAV 108 detachably coupled to a sabot 110 that is itself disposed in the launch tube 100. The sabot 110 may be hollow having an open end 112 oriented toward a high-pressure volume 114. A tether 116 may attach to the sabot 110, within a hollow of the sabot 110, and also attach to the inner wall 102 of the launch tube 100.

The UAV 108 may have a radial indentation 118 at a proximal end 120 of the UAV 108 from which a UAV clasp tab 122 may extend radially toward the inner circumferential wall 102 for coupling to a fastener 124. Similarly, the sabot 110 may have a clasp tab 126 extending radially toward the inner circumferential wall 102 from a radial indentation 128 at a proximal end 130 of the sabot 110 for coupling to the fastener 124. As illustrated in FIG. 1, the UAV and sabot clasp tabs (122, 126) may be rotationally aligned in complementary opposition to one another to enable the fastener 124, for example, a clasp 124 such as a u-shaped clasp, to detachably embrace both the UAV and sabot clasp tabs (122, 126). For example, each of the UAV and sabot clasp tabs (122, 126) may form a horizontal and planar surface, or substantially horizontal and substantially planar surface, upon which a complementary portion of the clasp 124 may rest when positioned to embrace the UAV and sabot clasp tabs (122, 126). Once the UAV 108, sabot 110 and clasp 124 are inserted into the launch tube 100, the inner circumferential wall 102 may rotationally restrain the clasp 124 from falling off of both the UAV clasp tab 122 and sabot clasp tab 126 to accomplish a coupling between the UAV 108 and sabot 110 that is detachable once the inner circumferential wall 102 no longer rotationally restrains the clasp 124.

In an alternative embodiment, the clasp 124 may be detachably coupled to the UAV clasp tab 122, and rotatably coupled to the sabot 110 at a hinge (not shown). In such an embodiment, the clasp 124 may rotate about the hinge (not shown) as the rotational restraint of the clasp 124 by the inner circumferential wall 102 is removed by, for example, the UAV 108 and clasp 124 beginning to exit the launch tube 100 or as the aperture 106 diameter is suitably increased.

The sabot 110 may be formed with, or assembled with, an expandable skirt 132 that may be axially restrained and detachably coupled to the inner wall 102 of the launch tube 100 downstream from a gas generator 134. As illustrated in FIG. 1, the expandable skirt 132 may be detachably coupled to a circumferential shell 136 within the tube using an adhesive coupling 138 to establish the high-pressure volume 114 between the expandable skirt 132 and circumferential shell 136. The circumferential shell 136 may be defined by an exterior surface of the gas generator 134. During operation, gas from the gas generator 134 may be introduced to the high-pressure volume 114. The resultant gas pressure pushes out on and expands the expandable skirt 132 at the adhesive coupling 138 to break the expandable skirt 132 free from the circumferential shell 136. The resulting gas pressure on the expandable skirt 132 may cause, or at least facilitate, the formation of a gas seal between the sabot 110 and the inner circumferential wall 102 of the launch tube 100 to better drive the sabot 110 along the inner wall 102 of the launch tube 100 by using the gas pressure differential between the high-pressure volume 114 and the side of the sabot opposite from the high-pressure volume. Formation of the pressure seal between the expandable skirt 132 and the inner circumferential wall 102 may be facilitated by a circumferential skirt protrusion 140 that may be formed in, and extend from, the expandable skirt 132 toward the inner circumferential wall 102 of the launch tube 100. In certain embodiments, the sabot 110 may be configured to form gaps between the sabot 110 and the inner circumferential wall 102 to provide a desired amount of gas leakage to prevent the launcher from becoming too hot or from containing the launch gases such that the structural integrity of the launcher is compromised or breached. Accordingly, sabot 110 embodiments may be sized to limit gas leakage and/or to limit the sound propagation of the sonic waves generated during the UAV 108 launch process.

The inner circumferential wall 102 may be formed of a prepeg substrate such as epoxy prepreg aramid fiber (KEVLAR®). The clasp 124 may be a rigid member formed of a thermoplastic polymer such as polyvinyl chloride (PVC), or formed of a metal such as aluminum or steel. The clasp 124 may be rotationally restrained by the inner circumferential wall 102 of the launch tube 100 against the UAV 108 and sabot 110.

Figure 2:
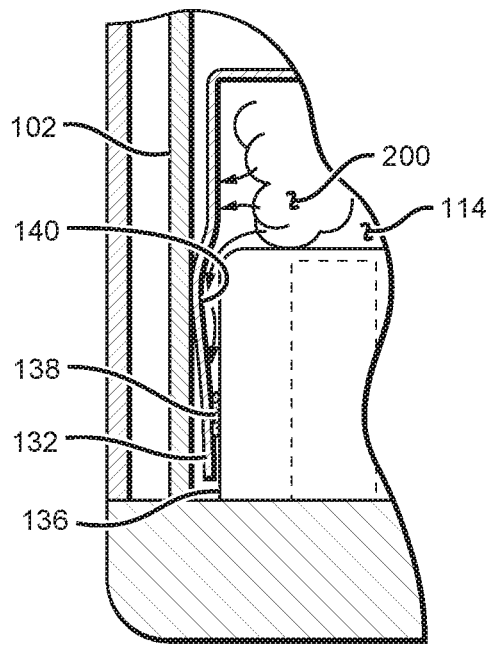
FIG. 2 is an expanded view of the expandable skirt, adhesive and shell first illustrated in FIG. 1 as gas pressure builds in a high-pressure volume against the expandable skirt.

FIG. 2 is an expanded view of the expandable skirt 132, adhesive coupling 138, and shell 136, first illustrated in FIG. 1, as gas pressure builds in the high-pressure volume 114 against the expandable skirt 132. The expandable skirt 132 may be detachably coupled to the shell 136 using the adhesive coupling 138. In an alternative embodiment, the adhesive coupling 138 may be replaced with another coupling that is configured to break upon gas 200 reaching a predetermined gas pressure within the high-pressure volume 114, for example, a suitable pin coupling the expandable skirt 132 to the shell 136. The circumferential skirt protrusion 140 may abut against the inner circumferential wall 102 as gas 200 is introduced into the hollow of the sabot.

Figure 3:
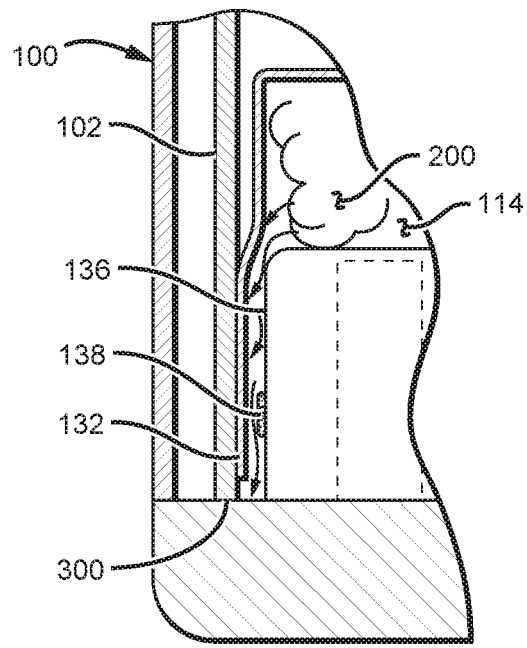
FIG. 3 is an expanded view of the expandable skirt, adhesive and shell first illustrated in FIG. 1 as the expandable skirt breaks an adhesive coupling that restrains the sabot in the launch tube.

FIG. 3 is an expanded view of the expandable skirt 132 and shell 136, first illustrated in FIG. 1, where gas pressure in the high-pressure volume presses against the expandable skirt to break an adhesive coupling 138 that restrains the sabot in the launch tube 100. Upon reaching a predetermined pressure, the adhesive coupling 138 is insufficient to couple the expandable skirt 132 to the shell 136 and adhesive restraint is broken between the exterior surface of the shell 136 and the expandable skirt 132 to axially release the expandable skirt 132 and sabot. The gas 200 continues to push the expandable skirt 132 against the inner circumferential wall 102 of the launch tube to reinforce the gas seal to drive the sabot up the launch tube. Although the expandable skirt 132 is illustrated as adhesively coupled to the shell 136 at a base 300 of the launch tube 100 and shell 136, the expandable skirt 132 may be coupled to a position higher on the shell 136. Also, although the adhesive coupling 138 is illustrated as having a bead or spheroid shape, the adhesive coupling 138 may take the form of a thin layer adhesive wherein the expandable skirt 132 may "rip" or peel away from the adhesive coupling 138 in response to the gas 200 reaching a predetermined gas pressure in the high-pressure volume 114 to push the expandable skirt 132 away from the shell 136.

FIG. 4 depicts the sabot 100, illustrated in FIG. 1, after release of the expandable skirt 132 from the shell 136 surrounding the gas generator 134. The gas generator 134 continues to generate gas 200 to pressurize the high-pressure volume 114 resulting in differential pressure against the expandable skirt 132 between the high-pressure volume 114 and the remainder of the launch tube to reinforce the gas seal that may exist between the circumferential skirt protrusion 140 and the inner circumferential wall 102. The sabot 110 may thus drive the UAV 108 through the aperture 106 and up the launch tube 100. The tether 116 coupled to the sabot 110 continues to spool outward to enable the sabot 110 to continue up the launch tube 100. The UAV 108 may remain detachably coupled to the sabot 110 through the clasp 124, with the clasp 124 rotationally constrained by the inner circumferential wall 102 so that the clasp 124 is prevented from decoupling from at least one of the UAV and sabot clasp tabs (122, 126). In FIG. 4, the aperture 106 is illustrated having a constant cross section. In an alternative embodiment, the aperture may have an expanding cross section in gradual preparation for rotational release of the clasp 124 from the UAV clasp tab 122, the sabot clasp tab 126, or both.

Figure 5:
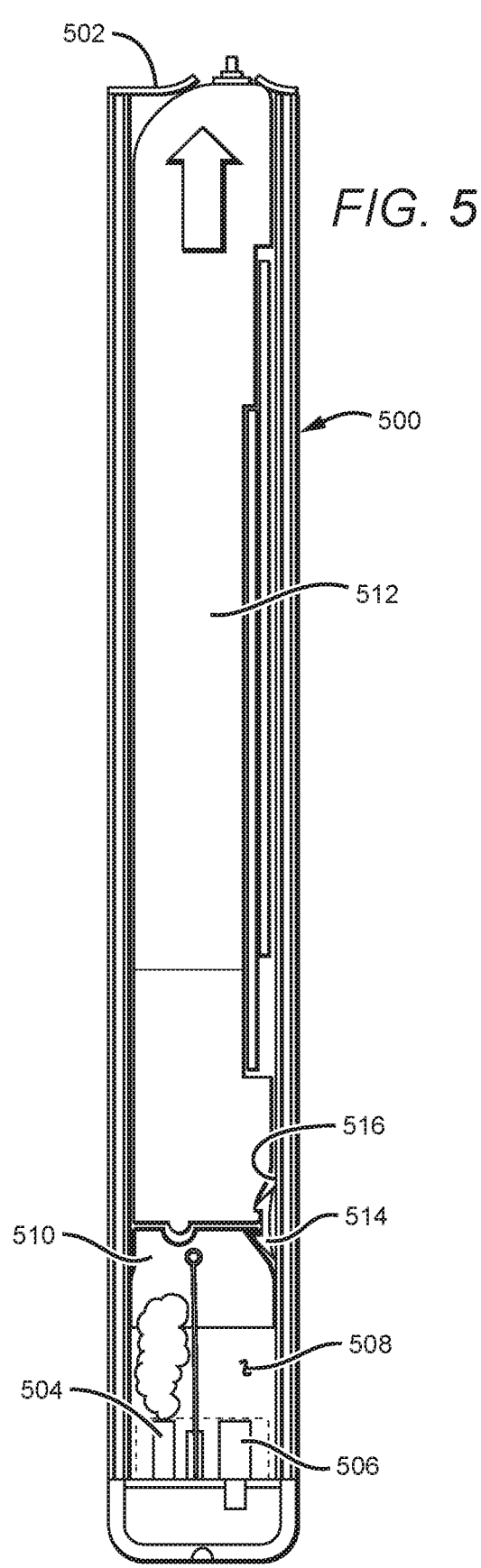
FIGS. 5 and 6 depict an exemplary UAV launch tube with the sabot detachably coupled to the UAV using, in one embodiment, a clasp restrained by the inner sidewall of the launch tube.

FIG. 5 depicts one embodiment of a launch tube 500 having a constant cross-sectional area along its length, with the sabot 510 detachably coupled to the UAV 512 using a clasp 514 detachably connected to both the sabot 510 and UAV 512 and rotationally constrained by the inner circumferential wall 516 of the launch tube 500. In this embodiment, the launch tube 500 is shown having an optional frangible seal 502 across a top opening of the launch tube 500. Two gas-generating canisters (504, 506) are shown disposed within a high-pressure volume 508 of the launch tube 500. In FIG. 5, the adhesive coupling that previously restrained the sabot 510 in the launch tube 500 has been broken (See FIG. 3), and the sabot 510 has moved a distance axially up the launch tube in response to a pressure differential between the high-pressure volume 508 and the side of the sabot opposite from the high-pressure volume. The UAV 512 is shown breaking the frangible seal 502 and beginning to exit the launcher 500 as the clasp 514 continues to be rotationally constrained by the inner circumferential wall 516 to maintain the detachable coupling between the sabot 510 and UAV 512.

Figure 6:
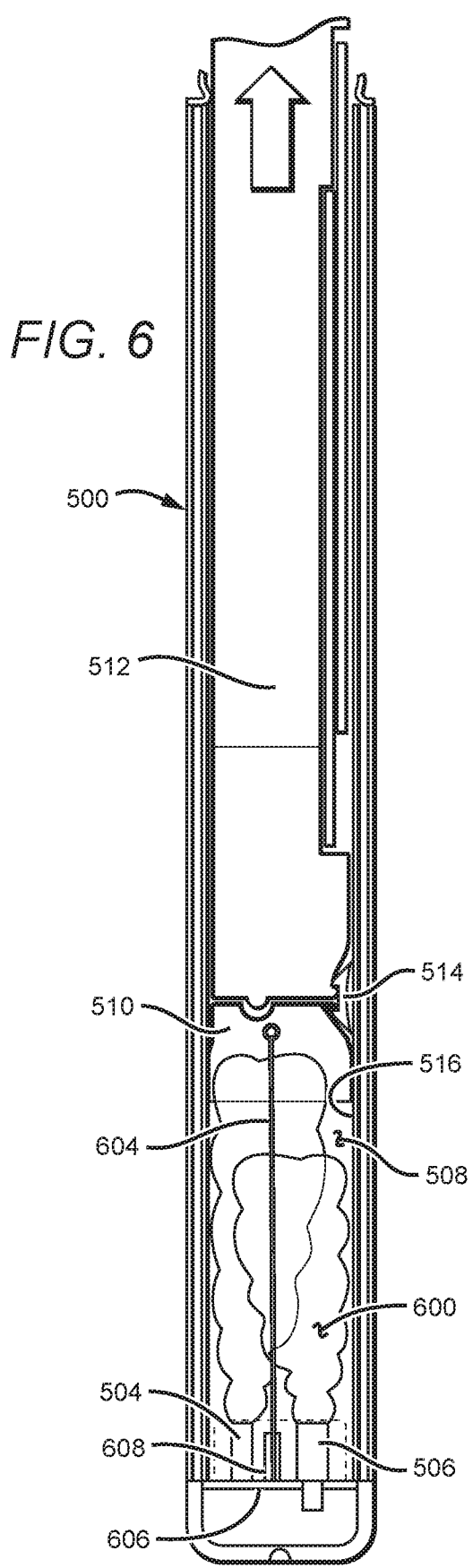

FIG. 6 depicts the UAV launch tube of FIG. 5, with the gas-generating canisters (504, 506) increasing the pressure—as depicted by the gas 600—within the high-pressure volume 508 between the inner circumferential wall 516 of the launch tube 500 and the sabot 510. A tether 604 may be attached to the inner circumferential wall 516 and/or to an inner base wall 606 via a tether reel or winding element 608. Relative to FIG. 5, the sabot 510 is shown displaced along the launch tube 500—in this example a right parallelepiped volume—moving with the UAV 512, which is detachably coupled to the sabot 510 by the clasp 514. In one embodiment, generation of gas by the gas generators (504, 506) may be staggered, so that one gas generator starts later in time than the other, to increase or sustain the pressure as the UAV 512 travels along and exits the launch tube 500.

FIG. 7 depicts the launch tube of FIGS. 5 and 6 as the sabot 510 approaches full payout, or a maximum distance of travel, as limited by the tether 604, to prevent the sabot 510 from exiting the launch tube and to substantially retain the gas within the launcher volume for subsequent controlled gas seepage into the surrounding atmosphere. In some embodiments using hot or warm gas generators, the sabot 510 travels approximately no further than the location depicted in FIG. 7. As the clasp 514 slides past the inner circumferential wall 516, the clasp 514 decouples from the UAV clasp tab 700 to allow the UAV 512 to continue unhindered out of the launch tube. In some embodiments, the maximum travel of the sabot 510 may be extended to allow the clasp 514 to decouple from both the UAV clasp tab 700 and sabot clasp tab 702, such as by allowing the clasp 514 to entirely clear the inner circumferential wall 516. In such an embodiment, the sabot 510, or the expandable sabot skirt 704 portion of the sabot 510, may substantially retain the gas within the launcher volume for subsequent controlled gas seepage into the surrounding atmosphere. The sabot 510 may also be provided with a side depression (not shown) to facilitate controlled release of the gas past the sabot 510 at the full payout position, whether fully-clearing the clasp 514 or not.

FIG. 8 depicts one embodiment of a launch tube 800 having an enlarged-aperture launch end. The clasp 514 is rotationally constrained by the inner circumferential wall 820 of the launch tube 800 along a portion of the launch tube length, rather than along the entire length as illustrated in FIGS. 5 and 6. Two gas-generating canisters (802, 804) are shown disposed within a high-pressure volume 806 of the launch tube 800. A tethered sabot 808 is shown disposed between the gas generating canisters (802, 804) and the UAV 810. The launch tube has a high-pressure aperture portion of constant cross-sectional area 812 to provide enhanced launch velocity and an enlarged-aperture launch portion 814 to accommodate a UAV payload 816 that may extend beyond the conventional fuselage of the UAV 810. For example, the UAV payload 816 may provide for cameras, sensors or other devices that extend beyond the fuselage of the UAV 810. The UAV 810 is shown breaking an optional frangible seal 818 and beginning to exit the launcher 800 as the clasp 514 continues to be rotationally constrained by an inner circumferential wall 820 to maintain the detachable coupling between the sabot 808 and UAV 810.

FIG. 9 depicts the enlarged-aperture launch portion 814 and UAV launch tube 800 of FIG. 8, with the gas-generating canisters (802, 804) increasing the pressure—as depicted by the gas 900—within the high-pressure volume 806 between the sabot 808 and the gas-generating canisters (802, 804). A tether 902 may be attached to the inner circumferential wall 820 and/or to an inner base wall 904 via a tether reel or winding element 906. Relative to FIG. 8, the sabot 808 is shown displaced along the launch tube 800—in this example a right parallelepiped volume—moving with the UAV 810, which may be detachably coupled to the sabot 808 by the clasp 514. In the illustrated embodiment of FIGS. 8 and 9, the sabot 808 has not yet approached the enlarged-aperture launch portion 814 and so the clasp 514 is still depicted as rotationally restrained by the inner circumferential wall 820 to detachably couple the UAV 810 to the sabot 808.

FIG. 10 depicts the clasp 514 illustrated in FIGS. 8 and 9 falling away from the UAV 810 to decouple the UAV 810 from the sabot 808 in the enlarged-aperture launch portion 814 of the launch tube. As the clasp 514 slides past the high-pressure aperture portion of constant cross-sectional area 812, the clasp 514 may no longer be rotationally constrained by the inner circumferential wall 820 and so the clasp 514 may fall away from the UAV clasp tab 1000 to allow the UAV 810 to continue unhindered out of the launch tube. In some embodiments, the sabot 808 has an expandable sabot skirt 1002 that may be configured to substantially retain the gas within the launcher volume to provide continued thrust of the sabot 808 substantially through the enlarged-aperture launch portion 814.

FIGS. 11 and 12 depict one embodiment of a launch tube 1100 having an enlarged-aperture launch portion 1104. The launch tube 1100 has a high-pressure aperture portion of constant cross-sectional area 1102 to provide enhanced launch velocity, and an enlarged-aperture launch portion 1104 to accommodate a UAV payload 1106 that may extend beyond the fuselage of the UAV 1108. Unlike the launch tube illustrated in FIGS. 8 and 9, the high-pressure aperture portion of constant cross-sectional area 1102 extends substantially throughout the launch tube 1100 length. In the embodiment illustrated in FIGS. 11 and 12, the enlarged-aperture launch end 1104 is introduced abruptly along the launch tube length to maximize the available high-pressure aperture portion length while accommodating the UAV payload 1106 toward the front of the UAV 1108. A clasp 1110 detachably couples the UAV 1108 to a sabot 1112 and is rotationally constrained by an inner circumferential wall 1114 of the launch tube 1100 along a substantial portion of the launch tube length prior to reaching the enlarged-aperture portion 1104 so that the clasp 1110 does not rotate away from the UAV 1108 and sabot 1112. As the clasp 1110 slides past the inner circumferential wall 1114 of the high-pressure aperture portion 1102, the clasp 1110 is no longer rotationally constrained by the inner circumferential sidewall 1114 and so the clasp 1110 may fall away from the UAV 1108 to allow the UAV 1108 to continue unhindered out of the launch tube 1100.

FIG. 13 depicts, in a bottom-side perspective view, an exemplary UAV in a pre-launch state 1300, i.e., with its wing 1302 and tail surfaces 1304 folded beneath the fuselage of the vehicle. Also shown is a propeller hub 1306 about which a propeller may be rotatably mounted. The air vehicle may include a radio frequency (RF) antenna 1308 conformal with or extending from the vehicle. Whether the tube volume is a right cylinder, a right parallelepiped, or some other shape, the cross-section or cross-sections of the UAV may be insufficient to maintain an air-tight fit between the vehicle and the inner walls of the launcher. Accordingly, for launches based on gas pressure, a sabot may be disposed between the gas source and the UAV.

FIG. 14 depicts an exemplary UAV in a launched state 1400 with its airfoils 1302, 1304 deployed and its pusher propeller 1402 rotating. The UAV may receive and/or send signals through an antenna, for example, an RF antenna 1308, which may be conformal with or extending out from the launched UAV 1400.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further it is intended that the scope of the present invention herein disclosed by way of examples should not be limited by the particular disclosed embodiments described above.

What is claimed is:

1. A method of launching an unmanned aerial vehicle (UAV) launch, comprising:
   generating gas in a gas generator;
   introducing said generated gas to a high-pressure volume between an expandable sabot skirt of a sabot and said gas generator to break an adhesive coupling that restrains said sabot in a launch tube, wherein said UAV is on a top surface of said sabot, a bottom of said sabot opposite to said top surface is open ended, and said expandable sabot skirt is a portion of a side surface of said sabot disposed proximate said open ended bottom of said sabot;
   pushing said expandable sabot skirt against an inner circumferential wall of said launch tube using said generated gas; and
   driving said sabot up said launch tube using said generated gas.

2. The method of claim 1, wherein said adhesive coupling comprises an adhesive coupling between said expandable skirt and a shell surrounding said gas generator.

3. The method of claim 1, further comprising:
   clasping a UAV to said sabot using a clasp; and
   restraining said clasp against said inner circumferential wall of said launch tube to prevent said clasp from decoupling from at least one of: said UAV and said sabot.

4. The method of claim 3, further comprising:
   sliding said clasp past said inner circumferential wall to release said clasp from at least one of: said UAV and said sabot.

5. The method of claim 3, further comprising:
   tethering said sabot to said launch tube to prevent said sabot from exiting said launch tube.

6. A method of launching an unmanned aerial vehicle (UAV) launch, comprising:
   restraining a sabot in a launch tube;
   introducing gas to a high-pressure side of an expandable sabot skirt of a sabot to break said restraint of said sabot in said launch tube, wherein said UAV is on a top surface of said sabot, a bottom of said sabot opposite to said top surface is open ended, and said expandable sabot skirt is a portion of a side surface of said sabot disposed proximate said open ended bottom of said sabot; and
   driving said sabot up said launch tube using said gas.

7. The method of claim 6, further comprising:
   pushing said expandable sabot skirt against an inner circumferential wall of said launch tube using said gas.

8. The method of claim 7, wherein said restraining a sabot comprises restraining said sabot using an adhesive.

9. The method of claim 8, wherein said restraining said sabot using an adhesive further comprises restraining an expandable skirt of said sabot to a shell surrounding a gas generator in said launch tube.

10. The method of claim 9, further comprising:
    tethering said sabot to said launch tube.

11. The method of claim 6, wherein said expandable sabot skirt further comprises a circumferential skirt protrusion that extends from said expandable sabot skirt toward an inner circumferential wall of said launch tube.

12. The method of claim 6, further comprising:
    restraining the travel of said sabot by a tether configured to prevent said sabot from exiting said launch tube, and wherein the restrained travel of said sabot substantially retains said gas within said launch tube.

13. The method of claim 12 wherein said tether is attached to said sabot and said inner circumferential wall of said launch tube by at least one of: a tether reel and a winding element.

* * * * *